(12) United States Patent
Onishi et al.

(10) Patent No.: US 12,187,459 B2
(45) Date of Patent: Jan. 7, 2025

(54) SPACECRAFT

(71) Applicant: Institute for Q-shu Pioneers of Space, Inc., Fukuoka (JP)

(72) Inventors: Shunsuke Onishi, Fukuoka (JP); Tetsuo Yasaka, Fukuoka (JP); Kazuo Kuno, Fukuoka (JP); Masahiko Uetsuhara, Fukuoka (JP); Yohei Koga, Fukuoka (JP)

(73) Assignee: Institute for Q-shu Pioneers of Space, Inc., Fukuoka (JP)

( * ) Notice: Subject to any disclaimer, the term of this patent is extended or adjusted under 35 U.S.C. 154(b) by 365 days.

(21) Appl. No.: 17/773,011

(22) PCT Filed: Nov. 5, 2019

(86) PCT No.: PCT/JP2019/043256
§ 371 (c)(1),
(2) Date: Apr. 28, 2022

(87) PCT Pub. No.: WO2021/090361
PCT Pub. Date: May 14, 2021

(65) Prior Publication Data
US 2022/0388691 A1 Dec. 8, 2022

(51) Int. Cl.
*B64G 1/10* (2006.01)
*B64G 1/66* (2006.01)
*H01Q 1/28* (2006.01)

(52) U.S. Cl.
CPC ............ *B64G 1/1007* (2013.01); *B64G 1/66* (2013.01); *H01Q 1/288* (2013.01)

(58) Field of Classification Search
CPC ......... B64G 1/1007; B64G 1/66; H01Q 1/288
See application file for complete search history.

(56) References Cited

U.S. PATENT DOCUMENTS 3,716,869 A * 2/1973 Gould, Jr. ............ H01Q 25/002
343/781 R
4,562,441 A * 12/1985 Beretta .................. H01Q 1/288
343/781 P (Continued)

FOREIGN PATENT DOCUMENTS

EP 0260442 A2 3/1988
EP 3352299 A1 * 7/2018 ............. H01Q 21/06

(Continued)

OTHER PUBLICATIONS

International Preliminary Report on Patentability for PCT/JP2019/043256, mailed May 10, 2022, 8 pages (with English Translation, 12 pages).

(Continued)

*Primary Examiner* — Nuzhat Pervin
(74) *Attorney, Agent, or Firm* — Klarquist Sparkman, LLP

(57) ABSTRACT

[Problem] To provide a spacecraft having a more effective arrangement of amplifiers. [Solution] Provided is a spacecraft comprising: a main body having a housing space for housing an electronic device within; an oscillator configured to output a radio wave including a frequency in a predetermined frequency band; an amplifier disposed on an exterior of the main body so as to be exposed to space and configured to amplify the power of the radio wave output by the oscillator; and an antenna, disposed on the exterior of the main body, for emitting the radio wave to the outside at the power amplified by the amplifier.

12 Claims, 7 Drawing Sheets

(56) References Cited

U.S. PATENT DOCUMENTS

| | | | | |
|---|---|---|---|---|
| 4,972,346 | A | * | 11/1990 | Kawano ............ H04B 7/15535 455/21 |
| 5,206,655 | A | | 4/1993 | Caille et al. |
| 5,523,722 | A | * | 6/1996 | Nakano ................ H03B 5/326 331/107 A |
| 5,870,063 | A | | 2/1999 | Cherrette et al. |
| 5,916,668 | A | * | 6/1999 | Long ...................... H01Q 1/002 343/873 |
| 6,268,835 | B1 | * | 7/2001 | Toland ................ H01Q 3/2605 343/915 |
| 7,324,065 | B2 | * | 1/2008 | Turchinetz ............. H01Q 1/38 343/909 |
| 7,513,462 | B1 | | 4/2009 | McKinnon et al. |
| 7,889,129 | B2 | * | 2/2011 | Fox .................... H01Q 21/0018 342/354 |
| 8,004,461 | B2 | * | 8/2011 | Kim ...................... B63C 9/0005 342/357.31 |
| 8,072,380 | B2 | * | 12/2011 | Crouch .................. H02J 50/40 342/370 |
| 8,248,298 | B2 | * | 8/2012 | Lalezari ................ H01Q 21/24 342/120 |
| 9,130,651 | B2 | * | 9/2015 | Tabe ...................... H01Q 1/245 |
| 9,237,211 | B2 | * | 1/2016 | Tabe ...................... H04W 52/04 |
| 9,743,357 | B2 | * | 8/2017 | Tabe ................ H04W 52/0245 |
| 9,766,595 | B2 | * | 9/2017 | Nakanishi ................ G04G 9/00 |
| 9,921,548 | B2 | * | 3/2018 | Mitani .................... G04G 5/00 |
| 10,622,127 | B2 | * | 4/2020 | Sakane ................ H01F 1/0054 |
| 10,919,778 | B2 | * | 2/2021 | Sakane .................... G11B 5/714 |
| 10,938,105 | B2 | * | 3/2021 | Snyder ................ H01Q 19/193 |
| 11,264,155 | B2 | * | 3/2022 | Yamaga .................... H01F 1/11 |
| 2003/0044623 | A1 | * | 3/2003 | Sakurai ................ H05K 9/0088 428/447 |
| 2003/0044633 | A1 | * | 3/2003 | Nagaraj .................. C23C 10/58 428/615 |
| 2003/0079893 | A1 | * | 5/2003 | Hashimoto .......... H05K 9/0088 174/394 |
| 2003/0132349 | A1 | * | 7/2003 | Hoang .................... B64G 1/36 244/171 |
| 2003/0164427 | A1 | * | 9/2003 | Glatkowski .............. C09D 5/24 244/171.7 |
| 2004/0036645 | A1 | * | 2/2004 | Fujieda .................. H01Q 1/421 342/72 |
| 2004/0227663 | A1 | * | 11/2004 | Suzuki .................. G01S 13/931 342/72 |
| 2005/0282043 | A1 | * | 12/2005 | Yamazaki ............. C04B 35/653 252/62.62 |
| 2007/0131894 | A1 | * | 6/2007 | Takada .................... H01F 1/348 252/62.63 |
| 2007/0241962 | A1 | * | 10/2007 | Shinoda ................ H01Q 1/425 342/361 |
| 2008/0206534 | A1 | * | 8/2008 | Brooks .................... B64G 1/66 428/220 |
| 2009/0224105 | A1 | * | 9/2009 | Caplin .................. B64G 1/242 244/164 |
| 2010/0060539 | A1 | * | 3/2010 | Suetsuna .................. H01Q 9/42 427/127 |
| 2010/0238063 | A1 | * | 9/2010 | Ohkoshi ............ C01G 49/0045 252/62.56 |
| 2012/0100064 | A1 | * | 4/2012 | Ohkoshi ................ C01G 49/06 423/633 |
| 2012/0105185 | A1 | * | 5/2012 | Oda ........................ H01F 1/0557 335/302 |
| 2012/0294201 | A1 | * | 11/2012 | Kurokawa ................ H03F 1/32 330/68 |
| 2013/0140076 | A1 | * | 6/2013 | Lee ........................ H01Q 17/002 174/391 |
| 2014/0091501 | A1 | * | 4/2014 | Hattori ............... C01G 49/0018 264/611 |
| 2015/0187380 | A1 | * | 7/2015 | Shirata ...................... H01F 1/11 427/127 |
| 2016/0257433 | A1 | * | 9/2016 | Wallinger ............. H05K 7/203 |
| 2016/0259047 | A1 | * | 9/2016 | Blech ..................... G01S 13/887 |
| 2016/0352022 | A1 | * | 12/2016 | Thomson ................ H01Q 1/288 |
| 2017/0275438 | A1 | * | 9/2017 | Kobayashi .......... H01F 1/14708 |
| 2018/0009677 | A1 | * | 1/2018 | Aga ........................ H01F 1/348 |
| 2018/0191078 | A1 | * | 7/2018 | Moore ................ H01Q 15/166 |
| 2018/0246202 | A1 | | 8/2018 | Kurose |
| 2018/0370197 | A1 | * | 12/2018 | Nagamune ............... C09D 7/61 |
| 2019/0025422 | A1 | * | 1/2019 | Edinger ................ G01S 7/295 |
| 2019/0051436 | A1 | * | 2/2019 | Imaoka ...................... H01F 1/22 |
| 2019/0058242 | A1 | * | 2/2019 | Tabe ...................... H01Q 1/248 |
| 2019/0101640 | A1 | * | 4/2019 | Devaraj ................ H01Q 19/10 |
| 2019/0109904 | A1 | * | 4/2019 | Binder .................... H04L 67/12 |
| 2019/0154439 | A1 | * | 5/2019 | Binder ..................... G01S 15/08 |
| 2019/0215994 | A1 | * | 7/2019 | Hiroi ...................... B32B 15/08 |
| 2019/0312356 | A1 | * | 10/2019 | Fujita ...................... H01F 1/375 |
| 2019/0380232 | A1 | * | 12/2019 | Machinaga ............... B32B 7/02 |
| 2020/0008328 | A1 | * | 1/2020 | Hiroi .......................... H01F 1/113 |
| 2020/0227833 | A1 | * | 7/2020 | Hiroi ....................... C01G 49/00 |
| 2020/0274611 | A1 | * | 8/2020 | Mendelsohn ........ H04B 7/2041 |
| 2021/0151895 | A1 | * | 5/2021 | Ohkoshi ................ H01F 1/375 |
| 2021/0194147 | A1 | * | 6/2021 | Nagano ................. B32B 15/085 |
| 2022/0181789 | A1 | | 6/2022 | Onishi et al. |
| 2024/0079776 | A1 | * | 3/2024 | Scarborough ............ H01Q 3/46 |

FOREIGN PATENT DOCUMENTS

| | | | |
|---|---|---|---|
| EP | 3958395 | A1 * | 2/2022 .......... B64G 1/1007 |
| JP | S49-34356 | B | 9/1974 |
| JP | S60-149500 | U | 10/1985 |
| JP | S63-82900 | A | 4/1988 |
| JP | H02-176489 | A | 7/1990 |
| JP | H07-50521 | A | 2/1995 |
| JP | H09-270621 | A | 10/1997 |
| JP | 2012-207981 | A | 10/2012 |
| WO | 2016/079945 | A1 | 5/2016 |

OTHER PUBLICATIONS

International Search Report and Written Opinion for PCT/JP2019/043256, mailed Dec. 24, 2019, ISA Japanese Patent Office, 10 pages (with English translation of International Search Report, 2 pages).
Extended European Search Report issued in related European Application No. 19951309.4 by the European Patent Office on Jun. 14, 2023 (8 pages).

\* cited by examiner

SPACECRAFT

CROSS REFERENCE TO RELATED APPLICATIONS

This is the U.S. National Stage of International Application No. PCT/JP2019/043256, filed Nov. 5, 2019, which was published in English under PCT Article 21(2).

TECHNICAL FIELD

The present disclosure relates to a spacecraft capable of emitting a radio wave including a frequency of a predetermined frequency band to the outside.

BACKGROUND ART

Conventionally, in a spacecraft such as an artificial satellite, a radio wave is emitted to the outside and used for communication with a ground station and data observation. Patent Document 1 describes a satellite including a microwave transmission device mounted on a satellite comprising an antenna horn to which a generated microwave signal is input and an antenna that emits the signal to the ground. In such a satellite, in order to realize a high output power, a high output power amplifier for amplifying the microwave signal generated before being input to the antenna horn has been used.

PRIOR ART DOCUMENTS LIST

Patent Document

Patent Document 1: JP2012-207981 A

SUMMARY OF INVENTION

Technical Problem

Taking account of the above-described technology, the present disclosure provides a spacecraft in which an amplifier is more effectively disposed according to various embodiments.

Solution to Problem

According to an aspect of the present disclosure, there is provided "a spacecraft comprising a main body that has an accommodation space for accommodating an electronic device therein; an oscillator configured to output a radio wave including a frequency of a predetermined frequency band; an amplifier that is disposed on an exterior portion of the main body to be exposed to space and configured to amplify electric power of the radio wave output by the oscillator; and an antenna that is disposed on the exterior portion of the main body and is for emitting the radio wave to an outside with the electric power amplified by the amplifier".

Advantageous Effects of Invention

According to the various embodiments of the present disclosure, it is possible to provide a spacecraft in which an amplifier is more effectively disposed.

Additionally, the effects described above are merely examples for convenience of description, and are not limited. In addition to or instead of the effects described above, any effect described in the present disclosure or an effect obvious to those skilled in the art can be exhibited.

DESCRIPTION OF EMBODIMENTS

Figure 1:
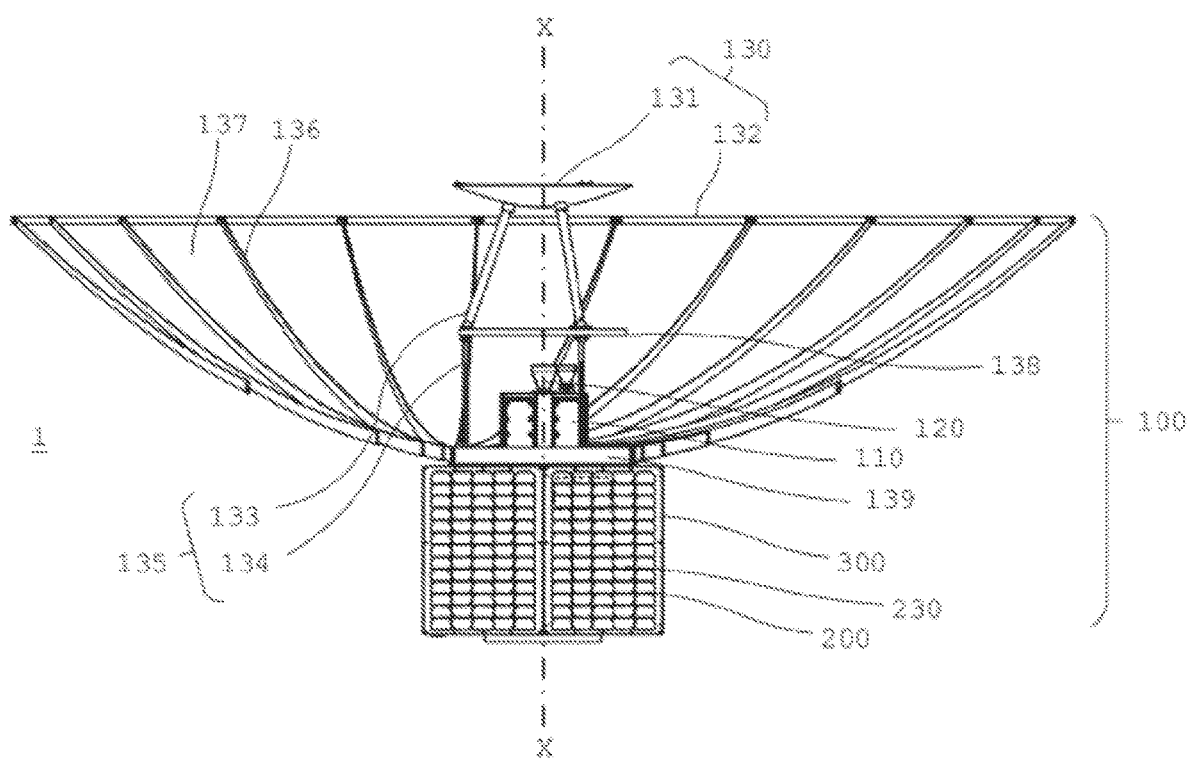
FIG. 1 is a view illustrating an outline of a configuration of a spacecraft 1 according to a first embodiment of the present disclosure.

Various embodiments of the present disclosure will be described with reference to the accompanying drawings. Additionally, common elements in the drawings are denoted by a same reference sign.

First Embodiment

1. Configuration of Spacecraft 1

FIG. 1 is a view illustrating an outline of a configuration of a spacecraft 1 according to a first embodiment of the present disclosure. According to FIG. 1, the spacecraft 1 comprises a main body 300 in which a device such as a control unit controlling navigation of the spacecraft 1 itself and controlling operation and an orientation of the spacecraft 1 or the like in space is mounted, a power supply unit 200 supplying electric power for driving various constituent elements including the control unit and a communication unit 100 in space, and the communication unit 100 for emitting a radio wave from the spacecraft 1 into space in which the ground or other spacecraft exist and for receiving a radio wave from space.

In the present embodiment, as an example, the spacecraft 1 can be used as a small synthetic aperture radar (SAR) satellite for mounting a SAR. Such a small SAR satellite can be used for performing observation, analysis, and the like of an observation target by emitting a radio wave in a microwave band, a millimeter wave band, or sub-millimeter wave band to the observation target and then receiving the radio wave reflected from the observation target. Here, in the SAR radar that receives the radio wave reflected from the observation target, an electric power amplifier needs to be mounted since high output electric power is required. Since the amplifier generates the high output power, the amplifier is very significant heat generating source. Therefore, particularly in a case where the spacecraft 1 is used as the small SAR satellite, it is very important how efficiently heat from the amplifier is dissipated. On the other hand, in the small SAR satellite, since electronic components including the amplifier need to be disposed in a limited accommodation space, it is more important to efficiently dispose the electronic components in consideration of a heat dissipation effect.

A case where the spacecraft 1 illustrated in FIG. 1 is used as the small SAR satellite will be described below. However, the present embodiment is not limited to the case of being used as the small SAR satellite, and can be applied to other applications, other forms (large satellite), and the like.

The main body 300 includes an accommodation space (not illustrated) for accommodating various electronic devices and mechanical components in the main body 300. As an example, the main body 300 is formed by an octahedron having a hexagonal shape in a top view, and is formed in a hollow shape in order to form the accommodation space in the main body 300. However, the shape of the main body 300 may be only required to be any shape capable of forming the accommodation space in the main body 300 and may be any other shape of a polyhedron or a sphere. Additionally, a case where the main body 300 is formed in an octahedral shape having a hexagonal shape in a top view will be described below.

Various electronic components such as a computer 301, a sensor 330, an actuator 340, a power supply control circuit 201, a battery 220, and a communication control circuit 170, and wirings for electrically connecting them are accommodated in the accommodation space formed in the main body 300.

The power supply unit 200 includes a solar panel 230 in the present embodiment. As an example, the solar panel 230 is disposed on a wall surface of the main body 300 so as to cover an outer surface of the main body 300. With such an arrangement, it is possible to effectively utilize the wall surface of the main body 300.

In addition to a transmitter 110, the communication unit 100 includes a radiator 120, a subreflector (sub reflection mirror) 131 that is disposed to face the radiator 120 at a predetermined angle and reflects a radio wave emitted from the radiator 120 to a main reflector 132, the main reflector 132 that is a main reflection mirror, disposed to face a mirror surface of the subreflector 131 and further reflects the radio wave reflected by the subreflector 131 to emit the radio wave to the outside, and a support rod 135 that supports the subreflector 131.

The main reflector 132 includes a hub 139, a plurality of ribs 136, a planar body 137, and the like. A reflection surface of the main reflector 132 is formed in a parabolic shape in order to function as the main reflection mirror as described above.

The hub 139 is disposed on an antenna axis X (also referred to as a central axis X of the hub 139) at a center of the main reflector 132 and on a side on which the subreflector 131 of the main body 300 is disposed. As an example, the hub 139 is formed in a substantially columnar shape and formed of a dielectric such as plastic or a metal such as titanium or stainless. The hub 139 has a central axis X as a center, and a plurality of the ribs 136 are radially arranged at predetermined intervals on an outer circumferential surface of the hub 139. That is, a cross sectional shape of the hub 139 (cross sectional shape when viewed from a direction along the central axis X) is circular, but the shape may be formed in either an elliptical shape or a polygonal shape.

The rib 136 includes a plurality of ribs. Each of the ribs 136 is radially arranged on an outer circumference of the hub 139 at predetermined intervals around the hub 139. An upper surface of each of the ribs 136 on a side serving as a reflection mirror surface is formed in a parabolic shape. The planar body 137 is provided on the upper surface formed in the parabolic shape. As an example, the rib 136 is a spring member formed of stainless spring steel or a composite material such as glass fiber reinforced plastics (GFRP) or carbon fiber reinforced plastics (CFRP), and has elasticity.

Additionally, in the present embodiment, the rib 136 includes a total of 24 ribs. However, the number of the ribs 136 can be changed, regardless of an even number or an odd number, according to an area of the deployable antenna at the time of deployment, a material and strength of the ribs to be used, and the like. Furthermore, in the present embodiment, the ribs 136 are disposed at predetermined intervals. However, all of the ribs 136 may be disposed at constant intervals, and may be disposed at partially dense intervals, or may be disposed at irregular intervals.

The planar body 137 forming the main reflector 132 together with the ribs 136 is provided between a pair of the ribs 136 adjacent to each other. The planar body 137 is formed of a material capable of reflecting the radio wave and has a parabolic shape as a whole. As an example, the planar body 137 is formed by a metal network (metal mesh) formed of molybdenum, gold, or a combination thereof. In the present embodiment, in the planar body 137, substantially triangular metal meshes are prepared according to the number of the ribs 136, and the metal meshes are coupled to be provided on upper surfaces of the ribs 136 formed in the parabolic shape.

The subreflector 131 is disposed to face the main reflector 132, and a lower surface side of the subreflector 131 (side corresponding to the main reflector 132) is supported by the support rod 135. The subreflector 131 is disposed to be spaced from the radiator 120 disposed on a line of the central axis X by a predetermined distance with the support rod 135. Similarly to the planar body 137 of the main reflector 132, the subreflector 131 is made of a material capable of reflecting the radio wave and has a quadratic surface shape as a whole toward the surface of the main reflector 132. The subreflector 131 reflects the radio wave radiated from the radiator 120 toward the main reflector 132. Therefore, the subreflector 131 is disposed to be spaced from the radiator 120 and the main reflector 132 by a predetermined distance.

The support rod 135 is disposed in order to dispose the subreflector 131 to be spaced from the radiator 120 and the main reflector 132 by a predetermined distance. The support rod 135 includes a first support rod 133 having one end connected to the subreflector 131 and the other end connected to a joint 138, and a second support rod 134 having one end connected to the joint 138 and the other end connected to the main body. The subreflector 131 connected to one end of the first support rod 133 is supported by the first support rod 133 and the second support rod 134. The support rod 135 includes one or more rods to support the subreflector 131. In the example of FIG. 1, three pairs of the support rods 135 (one is covered on the back surface and is not illustrated) are arranged at equal intervals. In the example of FIG. 1, it has been described that the first support rod 133 and the second support rod 134 form a pair. However, the present disclosure is not limited to this, and the number of the second support rods 134 may be reduced or increased with respect to the first support rod 133.

In the present embodiment, as the spacecraft 1, a small SAR satellite having a Cassegrain antenna of which the main reflector 132 is formed in a parabolic shape will be described. However, the present disclosure is not limited to this, and other parabolic antennas such as a Gregorian antenna or a planar antenna may be provided.

Figure 2:
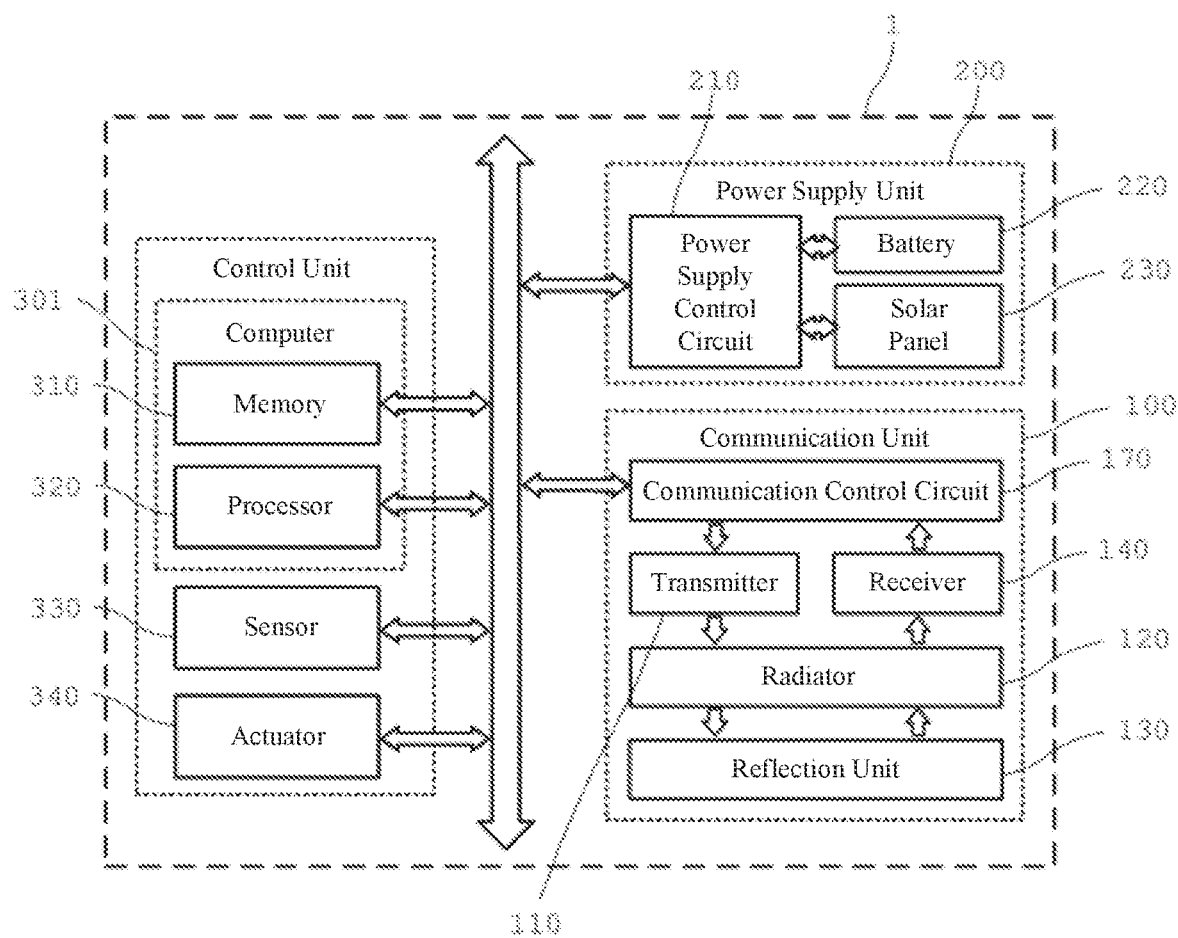
FIG. 2 is a block diagram illustrating a configuration of a spacecraft 1 according to a first embodiment of the present disclosure.

FIG. 2 is a block diagram illustrating a configuration of the spacecraft 1 according to the first embodiment of the present disclosure. The spacecraft 1 does not need to comprise all of the constituent elements illustrated in FIG. 2, and can have a configuration in which a part of the spacecraft 1 is omitted, or other constituent elements can be added. For example, the spacecraft 1 can also be provided with a plurality of the power supply units 200 and/or a plurality of the communication units 100.

According to FIG. 2, the spacecraft 1 comprises a control unit including a memory 310, a processor 320, and a sensor 330, the power supply unit 200 including a power supply control circuit 210, the battery 220, and the solar panel 230, and the communication unit 100 including the communication control circuit 170, the transmitter 110, a receiver 140, the radiator 120, and a reflection unit 130. These constituent elements are electrically connected to each other via a control line and a data line.

The memory 310 includes a RAM, a ROM, a nonvolatile memory, an HDD, and the like, and functions as a storage unit. The memory 310 stores, as a program, instruction commands for controlling the spacecraft 1 according to the present embodiment in various manners. As an example, the memory 310 appropriately stores an image of an outside of the spacecraft 1, which is captured by a camera (not illustrated), an observation value obtained by using the communication unit 100 as a radar, information received from the ground station via the communication unit 100 or information transmitted to the ground station via the communication unit 100, detection information obtained by the sensor 330 necessary for controlling the orientation and travel of the spacecraft 1, and the like.

The processor 320 functions as the control unit that controls the spacecraft 1 based on the program stored in the memory 310. Specifically, the power supply unit 200, the communication unit 100, the sensor 330, and the like are controlled based on the program stored in the memory 310. As an example, generation of information for performing transmission to the ground station or other spacecraft via the communication unit 100, and control related to the observation performed by emitting the radio wave to an observation target to receive the radio wave reflected from the observation target by using the communication unit 100 as a radar are performed.

As an example, the sensor 330 can include a gyro sensor, an acceleration sensor, a position sensor, a velocity sensor, a fixed star sensor, and the like, which are necessary for controlling the travel and orientation of the spacecraft 1, a temperature sensor, an illuminance sensor, an infrared sensor, and the like, which are for observing an external environment of the spacecraft 1, and a temperature sensor and an illuminance sensor, and the like, which are for measuring an internal environment of the spacecraft 1. The detected information and data are appropriately stored in the memory 310, used for control by the processor 320, and transmitted to a base station on the ground via the communication unit 100.

The actuator 340 can include, for example, a magnetic torquer, a reaction wheel, a control moment gyro (CMG), and the like. The actuator 340 is used to obtain torque and thrust for controlling the orientation of the spacecraft 1 in response to an instruction command from the processor 320, and functions as a propulsion unit.

The power supply unit 200 includes the power supply control circuit 210, the battery 220, and the solar panel 230, and functions as a power supply unit. The power supply control circuit 210 is connected to the battery 220 and controls charging and discharging of electric power of the battery 220. Under the control by the power supply control circuit 210, the battery 220 charges electric power generated by the solar panel 230 and accumulates the electric power to be supplied to each of drive systems such as the computer 301 and the communication unit 100 in the main body 300.

The communication unit 100 includes the communication control circuit 170, the transmitter 110, the receiver 140, the radiator 120, and the reflection unit 130, and functions as a communication unit. The communication control circuit 170 performs processing such as encoding/decoding of information and signals in order to transmit and receive information to and from the ground station or other spacecraft via the radiator 120 connected to the communication control circuit 170. The transmitter 110 includes an oscillator, an amplifier, and the like, and amplifies a radio wave having a frequency of a predetermined frequency band, which is generated by the oscillator, with the amplifier. The amplified radio wave is emitted to the reflection surface of the reflection unit 130 via the radiator 120. In the present embodiment, the communication unit 100 is used for performing the observation by using the radio wave emitted to the observation target and reflected from the observation target. Accordingly, the radio wave emitted from the radiator 120 is once reflected by the subreflector 131 forming the reflection unit 130 and emitted to the outside by the main reflector 132. On the other hand, the reflected radio wave received from the outside is received by the receiver 140 through a reverse path.

In the present embodiment, only the communication unit 100 including a pair of the subreflector 131 and the main reflector 132 will be described. The communication unit 100 can adjust a frequency of a microwave band such as a frequency band of 8 GHz or less, an 8 GHz to 12 GHz band (so-called X band), and a 12 GHz to 18 GHz band (so-called Ku band), a frequency of a millimeter wave band of 30 GHz or more, a frequency of a sub-millimeter wave band of 300 GHz or more, and the like as desired.

Figure 3:
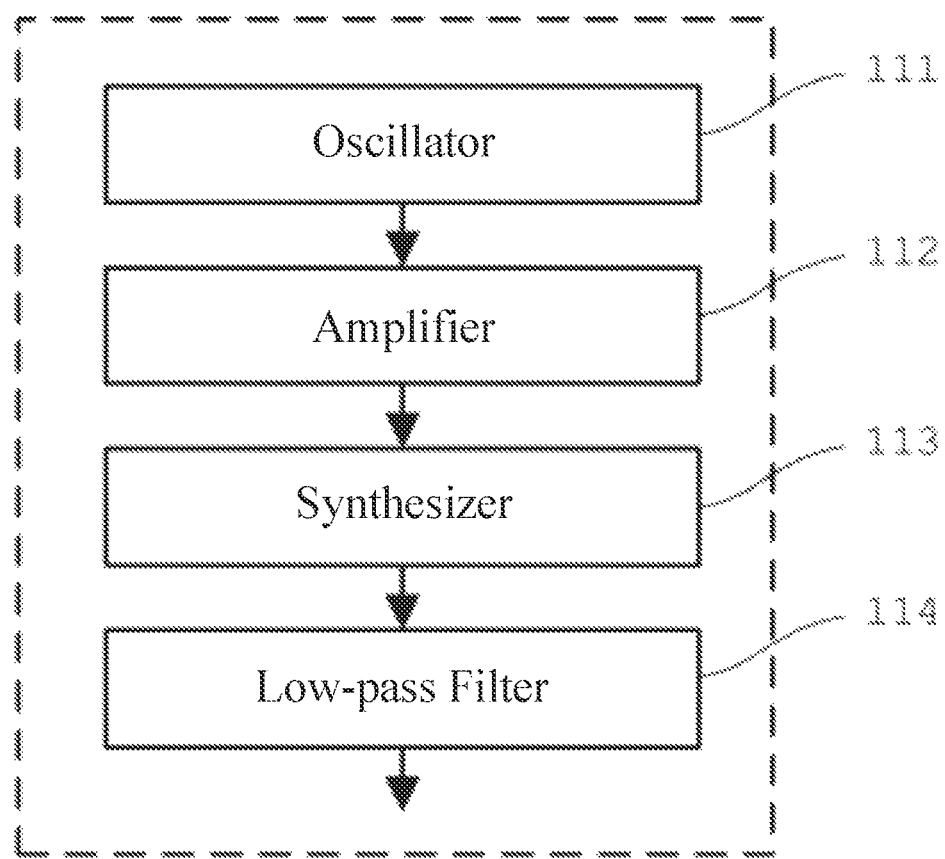
FIG. 3 is a block diagram illustrating a configuration of a transmitter 110 according to a first embodiment of the present disclosure.

FIG. 3 is a block diagram illustrating a configuration of the transmitter 110 according to the first embodiment of the present disclosure. Specifically, FIG. 3 is a diagram functionally illustrating an internal configuration of the transmitter 110 illustrated in FIG. 2. According to FIG. 3, the transmitter 110 includes an oscillator 111, an amplifier 112, a synthesizer 113, and a low-pass filter 114.

As an example, the oscillator 111 is disposed inside the main body 300 in FIG. 1. The oscillator 111 outputs a high frequency signal serving as a radio wave for transmitting a signal or the like. In the present embodiment, the oscillator 111 outputs a radio wave including at least any of frequencies of a microwave band such as a frequency band of 8 GHz or less, an 8 GHz to 12 GHz band (so-called X band), and a 12 GHz to 18 GHz band (so-called Ku band), a frequency of a millimeter wave band of 30 GHz or more, or a frequency of a submillimeter wave band of 300 GHz or more, preferably at least any of frequencies of a microwave band such as frequency band of 8 GHz or less, an 8 GHz to 12 GHz band (so-called X band), and a 12 GHz to 18 GHz band (so-called Ku band), and more preferably at least any of frequencies of an 8 GHz to 12 GHz band (so-called X band).

The amplifier 112 is electrically connected to the oscillator 111 and amplifies electric power of the radio wave output from the oscillator 111. In the present embodiment, as an example, data of the observation target is observed by emitting a radio wave toward the observation target and receiving the radio wave reflected from the observation target. Therefore, significantly high transmit electric power is required. In the present embodiment, the amplifier 112 amplifies the transmit electric power so as to be 500 W to 5,000 W, preferably 700 W to 2,500 W, and more preferably 1,000 W to 1,500 W. The amplifier 112 can be configured by combining one or more amplifiers in accordance with output capability of the amplifier. A specific configuration of the amplifier 112 will be described later. Additionally, the output capability of the amplifier is merely an example. For example, an upper limit and a lower limit of each range merely define the electric power required at the present time, and it is possible to obtain a desired effect such as a heat dissipation effect by applying the configuration according to the present embodiment as a matter of course even when the output capability exceeds the upper limit or the output capability is lower than the lower limit.

In a case where the amplifier 112 is configured by combining a plurality of the amplifiers, the synthesizer 113 is electrically connected to the amplifier 112 and synthesizes the radio waves output from the respective amplifiers into one carrier wave. The low-pass filter 114 is electrically connected to the synthesizer 113, and is used to extract only a low-frequency component from the radio wave output from the synthesizer 113 and remove the low-frequency component. For example, this is for removing the radio wave of a frequency band, of which use is restricted by the Radio Act. The radio wave which has passed through the low-pass filter 114 is output to the radiator 120 illustrated in FIG. 2 and emitted to the outside via the radiator 120.

Here, as the amplifier 112 included in the transmitter 110, a high output electric power amplifier is used as described above. Therefore, the amplifier 112 dissipates heat when operating, and adversely affects surrounding electronic devices. Moreover, when a temperature of the amplifier 112 is high, risk such as the damage of the element itself constituting the amplifier 112 is increased. Accordingly, in the present embodiment, the amplifier 112 is disposed on an exterior portion of the main body 300 and exposed to space. In this configuration, the amplifier 112 can be isolated from other electronic devices such as the processor 320, which are accommodated in the accommodation space inside the main body 300, and adverse effects on other electronic devices can be reduced. Furthermore, in a case where the spacecraft 1 is going around a satellite orbit, it is also possible to efficiently cool the amplifier 112 by exposing the amplifier 112 to space.

Figure 4:
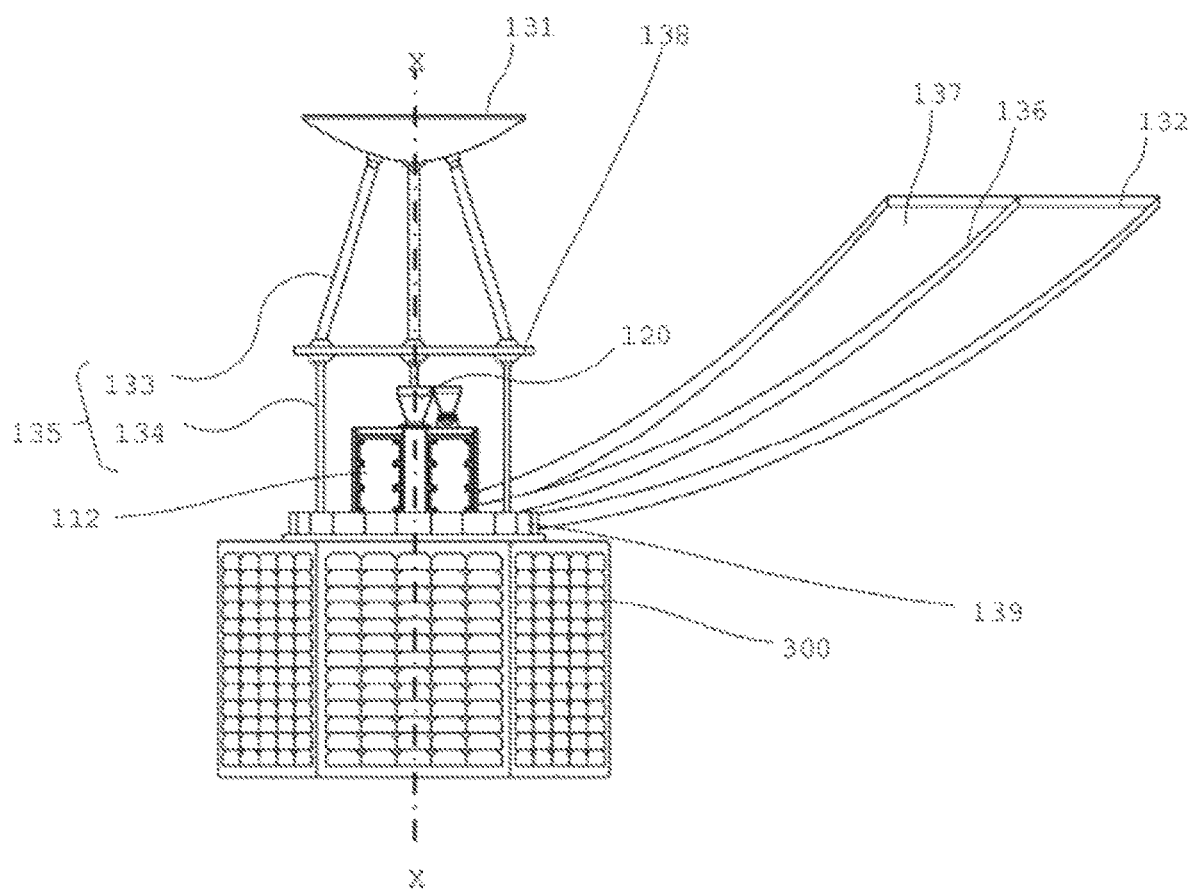
FIG. 4 is a side view illustrating an outline of a configuration of a spacecraft 1 according to a first embodiment of the present disclosure.
Figure 5:
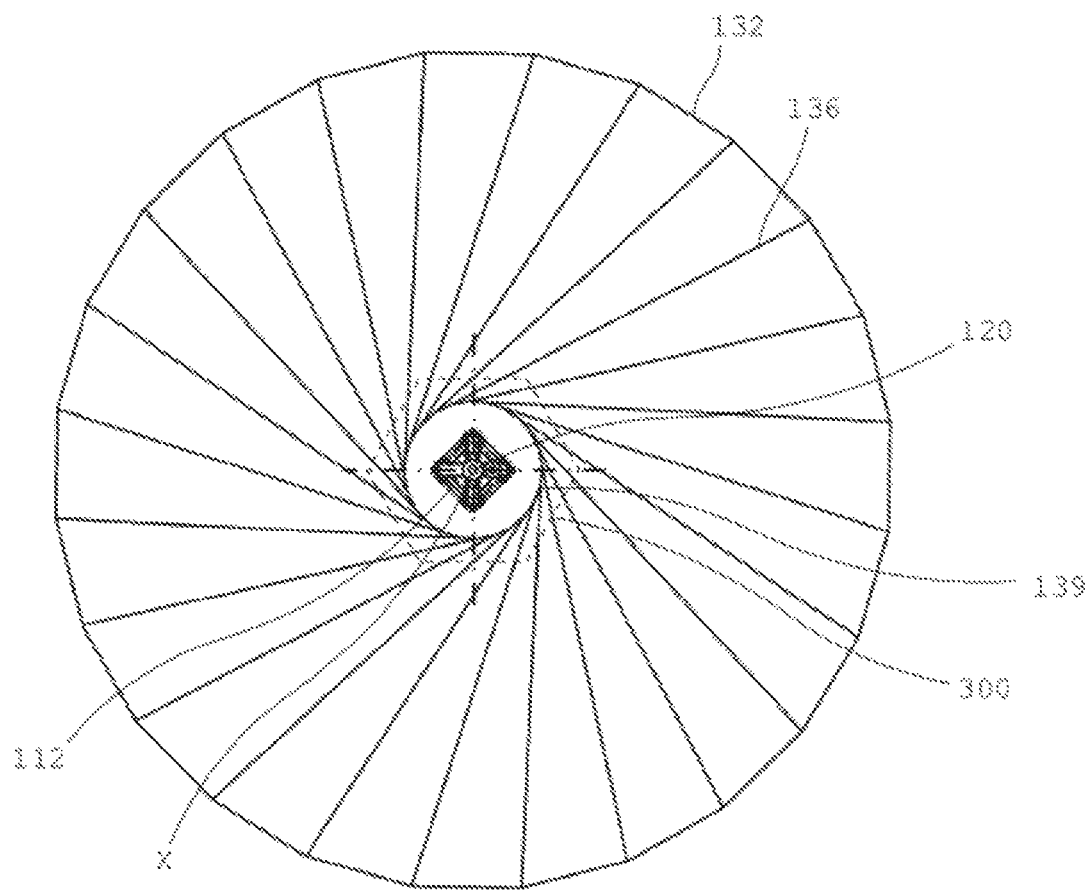
FIG. 5 is a top view illustrating an outline of a configuration of a spacecraft 1 according to a first embodiment of the present disclosure.

FIG. 4 is a side view illustrating an outline of a configuration of the spacecraft 1 according to the first embodiment of the present disclosure. Specifically, FIG. 4 is a view in which a partial configuration of the main reflector 132 is omitted in order to illustrate the arrangement position of the amplifier 112. Furthermore, FIG. 5 is a top view illustrating an outline of a configuration of the spacecraft 1 according to the first embodiment of the present disclosure. Specifically, FIG. 5 is a view in which a partial configuration of the subreflector 131 is omitted in order to illustrate the arrangement position of the amplifier 112.

First, according to FIG. 4, on the upper surface of the main body 300 formed by an octahedron having a hexagonal upper surface and a hexagonal bottom surface, the hub 139, which is formed in a substantially columnar shape and on which the ribs 136 forming the main reflector 132 are radially disposed at equal intervals on the outer circumference, is disposed. The hub 139 has, as an example, a substantially circular shape when viewed from a direction along the central axis X in cross section. The amplifier 112 is disposed at a substantially central position of the hub 139 formed in a circular shape and on the same surface (that is, the upper surface) as the main body 300 on which the hub 139 is disposed. Therefore, the amplifier 112 is not accommodated in the accommodation space inside the main body 300, but is disposed on a surface exposed to space.

Furthermore, in the present embodiment, the radiator 120 is of course not limited to this configuration, but is configured as a horn type radiator as an example. Furthermore, the subreflector 131 is disposed to be spaced from the horn type radiator 120 by a predetermined interval by using the support rod 135 including the first support rod 133, the second support rod 134, and the joint 138. In the present embodiment, the amplifier 112 is disposed at a position close to the radiator 120 and on a line (that is, on the line of the central axis X) connecting the radiator 120 with the subreflector 131. The arrangement positions of the amplifier 112 and the radiator 120 are merely examples, and may not be disposed on the line of the central axis X as a matter of course.

In general, the radio wave amplified by the amplifier 112 is electrically transmitted via a coaxial cable and/or a waveguide until reaching the radiator 120 via various electronic components electrically connected to each other. In this transmission process, electric power loss occurs when the radio wave passes through each electronic component and the coaxial cable, and the transmission efficiency thereof is reduced. Therefore, as in the present embodiment, by disposing the amplifier 112 at a position close to the radiator 120 and on a line (that is, on the line of the central axis X) connecting the radiator 120 with the subreflector 131, it is possible to minimize a wiring distance by using the coaxial cable and/or the waveguide, and to reduce the electric power loss.

Next, according to FIG. 5, the hub 139 is formed in a substantially circular shape in a top view, and is disposed on the upper surface of the main body 300 formed in a hexagonal shape. Furthermore, the center of the hub 139 is disposed so as to pass through the central axis X. On the outer circumferential surface of the hub 139, a plurality of the ribs 136 forming the main reflector 132 are disposed at equal intervals. In the present embodiment, it is not illustrated in FIG. 5, but the subreflector 131 is disposed so that the center of the subreflector 131 is positioned on the central axis X of the hub 139. Therefore, the radiator 120 that emits the radio wave to the subreflector 131 is also disposed on the central axis of the hub 139.

Furthermore, in the present embodiment, the amplifier 112 is disposed on the upper surface of the main body 300 formed in a hexagonal shape and immediately below the radiator 120 for the purpose of reducing the wiring distance to the radiator 120. Therefore, the amplifier 112 is disposed so as to be positioned substantially at the center of the hub 139.

2. Configuration of Amplifier

Figure 6:
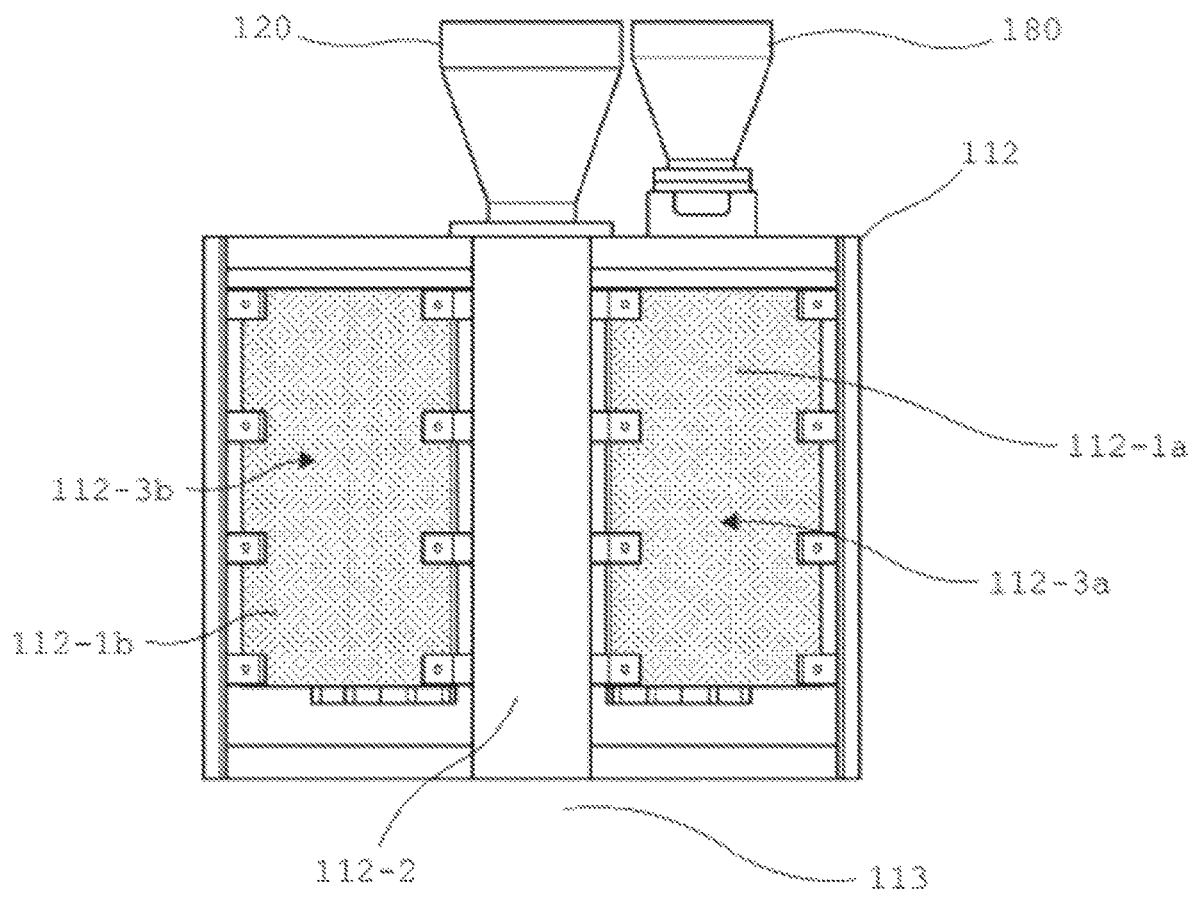
FIG. 6 is a side view illustrating an outline of a configuration of an amplifier 112 according to a first embodiment of the present disclosure.
Figure 7:
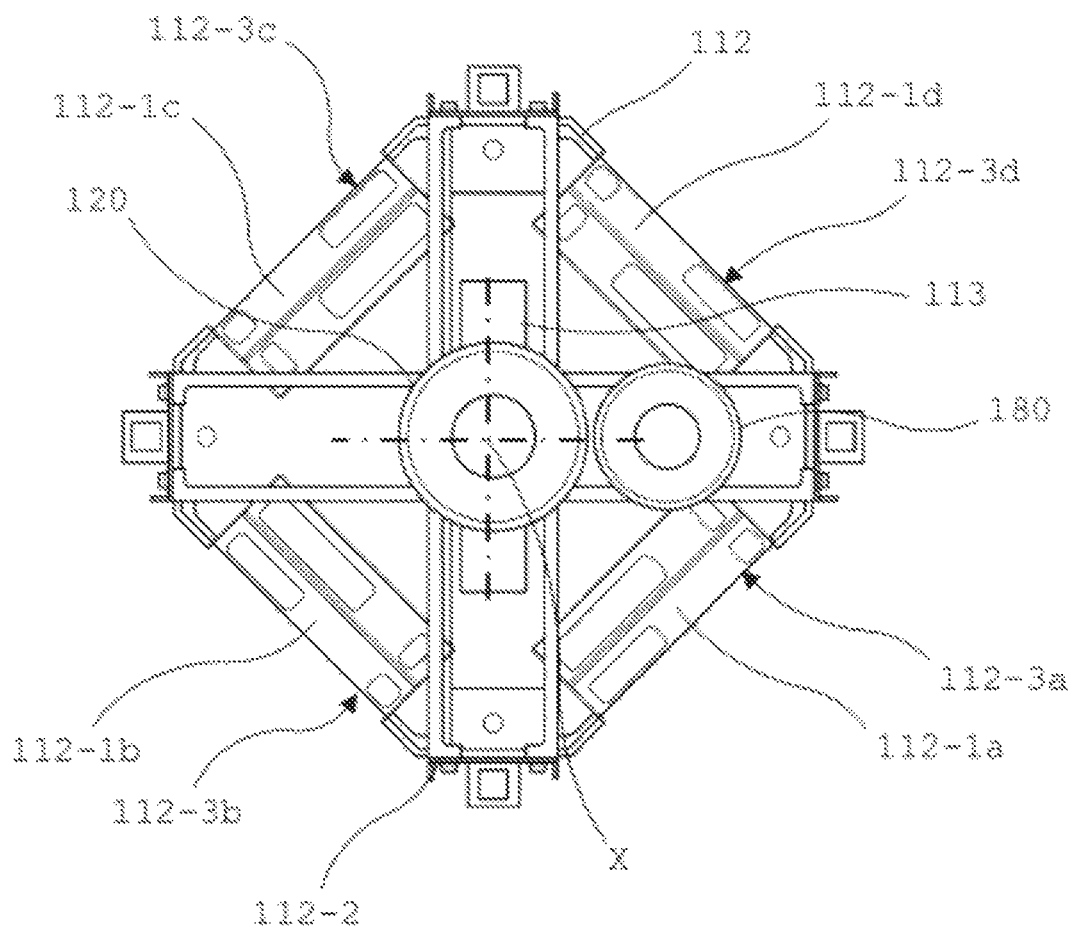
FIG. 7 is a top view illustrating an outline of a configuration of an amplifier 112 according to a first embodiment of the present disclosure.

FIG. 5 is a top view illustrating an outline of a configuration of the spacecraft 1 according to the first embodiment of the present disclosure. Furthermore, FIG. 6 is a side view illustrating an outline of a configuration of the amplifier 112 according to the first embodiment of the present disclosure. According to FIGS. 5 and 6, the amplifier 112 includes four amplifiers 112-1a to 112-1d. In the examples of FIGS. 5 and 6, the four amplifiers 112-1a to 112-1d are disposed so as to form side surfaces of a rectangular parallelepiped respectively. These amplifiers 112-1a to 112-1d are supported by a frame 112-2 disposed so as to connect the amplifiers. That is, it is not illustrated in FIGS. 5 and 6, but the amplifiers 112-1a to 112-1d are fixed to the upper surface of the main body 300 via the frame 112-2. In the examples of FIGS. 5 and 6, the four amplifiers are disposed so as to form the side surfaces of the rectangular parallelepiped, but the number of amplifiers to be used may be one or plural other than four. It is possible to appropriately adjust the number of amplifiers in accordance with the desired electric power.

In the examples of FIGS. 5 and 6, at least a part of the amplifier 112, specifically, outer surfaces 112-3a to 112-3d on sides exposed to space is coated with silver-deposited Teflon, aluminum-deposited Teflon, indium oxide, indium tin oxide, white paint, black paint, or a combination thereof, and preferably the silver-deposited Teflon or the aluminum-deposited Teflon, in order to further increase the heat dissipation effect. This coating can be formed by any method as necessary, such as sticking a coating material formed in a sheet shape or spraying a coating agent formed in a liquid state. Furthermore, in the examples of FIGS. 5 and 6, only the surface exposed to space is coated, but the present disclosure is not limited to this, and the upper surface or the inner surface may be coated.

The four amplifiers 112-1a to 112-1d are connected to the synthesizer 113 by a coaxial cable and/or a waveguide (not illustrated) having one end connected to each of the amplifiers 112-1a to 112-1d and the other end connected to the synthesizer 113. The radio waves power-amplified by the amplifiers 112-1a to 112-1d are synthesized by the synthesizer 113. Here, in the examples of FIGS. 5 and 6, the horn type radiator 120 is disposed on the central axis X which is a center of the amplifiers 112-1a to 112-1d disposed so as to form the side surfaces of the rectangular parallelepiped. The synthesizer 113 and the radiator 120 are disposed on the upper surface side of the main body 300 by the frame 112-2 together with the amplifiers 112-1a to 112-1d.

Furthermore, in the present embodiment, the other communication unit 180 is adjacent to the radiator 120, and also fixed to the frame 112-2. The communication unit 180 includes the horn type radiator, and is used, for example, for communication in a frequency band of 12 GHz to 18 GHz band (so-called Ku band) used for data transmission from the spacecraft 1 to the ground station. In this case, unlike the communication unit 100 that needs to receive a reflected radio wave from the observation target for observation, since a radio wave only needs to be transmitted to the ground station, an amplifier having a higher output than that of the communication unit 100 is not required. Therefore, the communication unit 180 includes, for example, only a low power amplifier.

As described above, in the present embodiment, the amplifier 112 is disposed on the surface of the main body 300 exposed to space. According to this, not only the heat dissipation effect of the heat generated by the amplifier 112 can be enhanced, but also the amplifier 112 which is a heat generating source can be isolated from other electronic devices, so that the adverse effect can be reduced. Furthermore, by enhancing the heat dissipation effect of the amplifier 112, the risk such as the damage of the element itself constituting the amplifier 112 can be reduced. Moreover, particularly in the small SAR satellite, the limited accommodation space of the main body 300 can be effectively used.

Other Embodiment

In the first embodiment, the amplifier 112 is disposed on the antenna arrangement surface side of the main body 300. However, the present disclosure is not limited to this, and the amplifier 112 can be disposed on the other surface of the main body 300. For example, similarly to the first embodiment, it is possible to enhance the heat dissipation effect of the amplifier 112 by disposing the amplifier 112 on a lower surface of the main body 300, the lower surface being exposed to space.

In the first embodiment, the communication unit 100 having a so-called Cassegrain antenna having the subreflector 131 in addition to the main reflector 132 has been described. However, the present disclosure is not limited to the communication unit 100, and the communication unit may be a Gregorian type communication unit, a communication unit having a parabolic shape that emits a radio wave from a front surface of the reflector 121, or a communication unit having a planar antenna.

It is also possible to make a configuration by appropriately combining or replacing each element described in each embodiment.

REFERENCE SIGNS LIST 1 spacecraft
100 communication unit
200 power supply unit
300 main body

The invention claimed is:

1. A spacecraft comprising:
a main body that has an accommodation space for accommodating an electronic device therein;
an oscillator configured to output a radio wave including a frequency of a predetermined frequency band;
an amplifier that is disposed on an exterior portion of the main body to be exposed to space and configured to amplify electric power of the radio wave output by the oscillator; and
an antenna that is disposed on the exterior portion of the main body and is for emitting the radio wave to an outside with the electric power amplified by the amplifier,
wherein the amplifier and the antenna are fixed on a same exterior surface of the exterior portion of the main body to be arranged along a central axis of the antenna.

2. The spacecraft according to claim 1, wherein the predetermined frequency band is a microwave band.

3. The spacecraft according to claim 1, wherein the predetermined frequency band is the range of 8 GHz to 12 GHz band.

4. The spacecraft according to claim 1, wherein the amplifier amplifies the electric power of the radio wave so as to be the range of 500 W to 5,000 W.

5. The spacecraft according to claim 1, wherein the antenna is configured to receive a radio wave emitted from the antenna and reflected from an observation target.

6. The spacecraft according to claim 1, wherein
the amplifier is configured by combining a plurality of amplifiers, and
the spacecraft further comprises a synthesizer that synthesizes radio waves output from a plurality of the amplifiers.

7. The spacecraft according to claim 1, wherein the main body is formed in a polyhedral shape.

8. The spacecraft according to claim 1, wherein
the antenna includes a radiator that emits the radio wave with the electric power amplified by the amplifier, a main reflector that emits the radio wave to the outside, and a subreflector that reflects the radio wave emitted from the radiator toward the main reflector, and
the amplifier is disposed on a line connecting the radiator with the subreflector.

9. The spacecraft according to claim 8, further comprising
a hub that is disposed on a surface of the main body on the subreflector side, of which a cross section is formed in a circular shape, an elliptical shape, or a polygonal shape, and that is configured to connect ribs forming the main reflector,
wherein the amplifier is disposed so as to be positioned substantially at a center of the hub.

10. The spacecraft according to claim 1, wherein at least a part of the amplifier is coated with silver-deposited Teflon, aluminum-deposited Teflon, indium oxide, indium tin oxide, white paint, black paint, or a combination thereof.

11. The spacecraft according to claim 1, wherein the amplifier and the antenna are fixed in contact with the same exterior surface of the main body.

12. The spacecraft according to claim 9, wherein the amplifier is disposed on the same exterior surface of the main body as the hub.

* * * * *